United States Patent [19]
Richt

[11] 3,952,932
[45] Apr. 27, 1976

[54] TRANSPORT SYSTEM FOR MAGNETIC TAPE RECORDER AND REPRODUCER SETS, PARTICULARLY FOR CASSETTE MAGNETIC TAPE RECORDERS

[76] Inventor: O. Hubert Richt, Buchenweg 14, Socking, Germany, 8135

[22] Filed: May 2, 1975

[21] Appl. No.: 573,888

Related U.S. Application Data

[63] Continuation of Ser. No. 442,166, Feb. 13, 1974, abandoned.

[30] Foreign Application Priority Data
Feb. 16, 1973  Germany............................ 2307825

[52] U.S. Cl................................... 226/49; 226/42; 226/111; 226/178
[51] Int. Cl.²......................................... B65H 17/20
[58] Field of Search .................. 226/30, 42, 49, 50, 226/111, 178, 188

[56] References Cited
UNITED STATES PATENTS

3,112,052  11/1963  Johnson................................ 226/42
3,419,202  12/1968  Maxey............................ 226/111 X
3,861,573  1/1975  Kawasaki........................ 226/111 X

*Primary Examiner*—Richard A. Schacher
*Attorney, Agent, or Firm*—Heinrich W. Herzfeld; Gilbert L. Wells

[57] ABSTRACT

A tape transport system for use in a magnetic tape recorder and reproducer set is described wherein a magnetic tape is simultaneously driven by means of two capstans, and which further comprises two motors, one of which is associated with one of the capstans, and the other with the other capstan, driving discs connected to the motors, transmission belt means connecting the driving discs of the two motors with one another, and means for operating the motor downstream, relative to the moving magnetic tape, as the driving motor for the tape. Electrical braking means for braking the motor upstream relative to the other motor seen in the direction of the moving tape are also provided.

10 Claims, 2 Drawing Figures

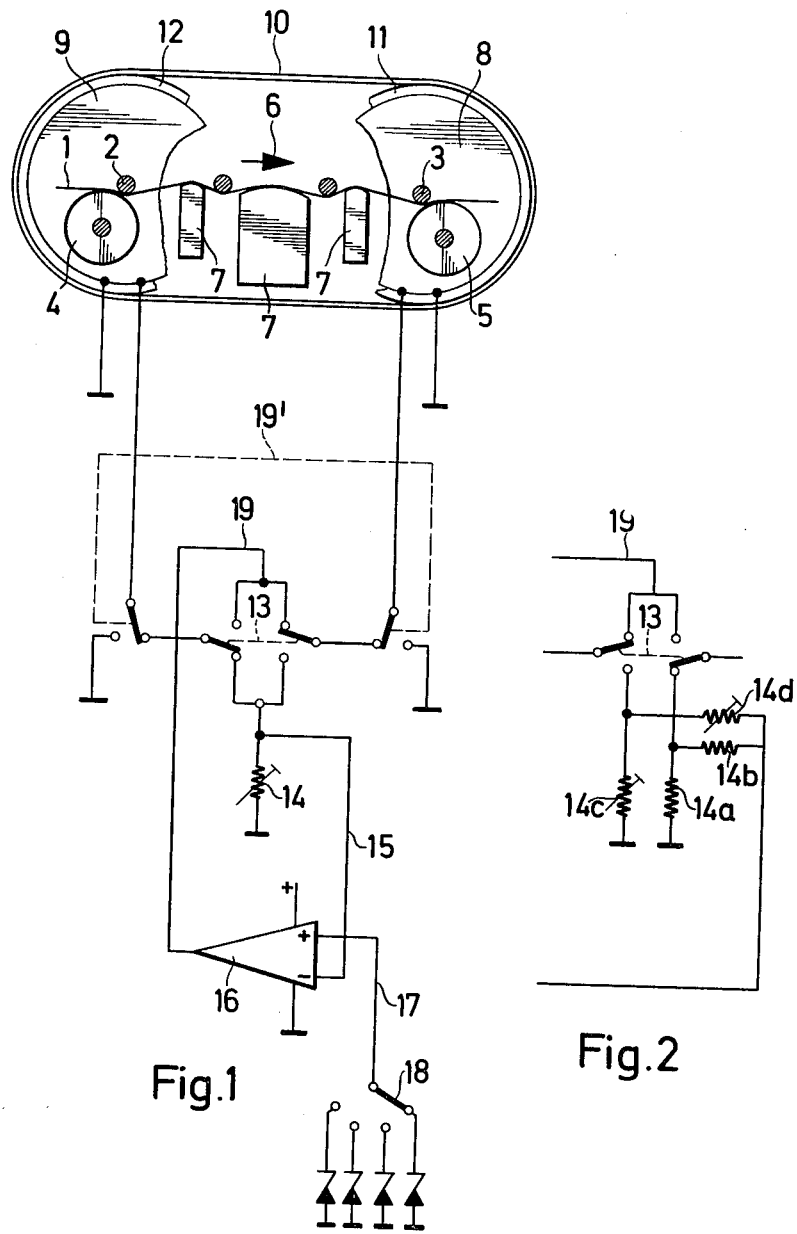

TRANSPORT SYSTEM FOR MAGNETIC TAPE RECORDER AND REPRODUCER SETS, PARTICULARLY FOR CASSETTE MAGNETIC TAPE RECORDERS

This is a continuation of application Ser. No. 442,166 filed Feb. 13, 1974, and now abandoned.

BACKGROUND OF THE INVENTION

This invention relates to a transport system for magnetic tape recorder and reproducer sets, and particularly for cassette magnetic tape recorders, in which the magnetic tape is driven by means of two capstans.

In order to assure an unobjectionable tape run and a satisfactory contact between the tape and a magnetic recording and reproducing head, the tape should be tensioned and moved with the utmost uniformity past the head. However, the tape reels and tape winding equipment of tape recorders are always subject to inaccuracies of running which cause corresponding fluctuations of the tape tension and thereby deteriorate the constancy of the running properties of the tape and the contact between the latter and the head.

It is known that these drawbacks can be avoided by driving the tape with two capstans, in which case the magnetic head is located between the two capstans. In order to stabilize the synchronized running of the capstans, each of them is provided with a gyratory mass and the capstans are driven in the same sense of rotation by means of a common belt from a single motor.

The reach of the belt from the first to the second gyratory mass undergoes an extension of its length due to the driving moment transmitted thereto, and this tape extension causes the second gyratory mass to run at a lower rpm than the first one. The reach of the magnetic tape transported between the two capstans with the aid of pressure rollers is thereby tensioned in a desired degree. Moreover, this tape reach is not subject to any uneven running of the tape reels or of the winding equipment.

A disadvantage of a known tape transport system resides in the fact that, in order to attain a sufficient constancy of speed in the running of the capstans, the latter must be provided with gyratory masses. However, when reversing the direction of running and when starting or stopping the tape solely by switching off the motor current, the inertia of the gyratory masses affects the switching times disadvantageously.

OBJECT AND SUMMARY OF THE INVENTION

It is an object of the invention to retain the advantages of the known system, but at the same time to avoid the above-described drawbacks.

This object is attained according to the invention in the transport system initially described, by the improvement comprising two motors, each driving a capstan directly, and transmission belt means for connecting these motors with each other, which means are preferably in the form of a thin flat belt; the motor "downstream" of the magnetic head (seen in the direction of advance of the magnetic tape) being adapted to driving the latter.

According to another feature of the invention, means are provided for braking the "upstream" motor electrically, depending on the desired degree of tensioning of the tape.

Furthermore, according to a further feature of the invention, the upstream motor is circuited as a tachometer generator for emitting signals which control the speed of rotation of the downstream motor.

Because of their small inertia and also because they are particularly suitable for use as tachometer generators, commutator motors which have iron-free rotors and the spindles of which are adapted to serve as capstans are particularly preferred.

According to a further feature of the invention, means are provided for maintaining the pressure of the pressure rollers against the magnetic tape on the capstans when reversing the direction of running of the tape, and only to switch the operating current from the downstream motor to the upstream motor, and correspondingly to apply the electric braking means as well as the tacho voltage to the other motor.

According to a further feature of the drive system for fast stopping of the means are provided for maintaining pressure by the pressure rollers on the tape at the capstans are applied during a rapid stopping of the tape run, and, in order to switch off only the motor current and thereby to shorten the stopping time, means are provided for short-circuiting the rotor windings of the motors.

Finally, according to yet another feature of the invention, a transistor circuit having differential input means is provided as motor rpm adjusting means for controlling the drive motors, wherein the tachometer voltage is always applied as actual value to an inverting input line of the rpm adjusting means while the reference voltage is applied, as the assigned value corresponding to the desired tape speed, to the non-inverting input line of the aforesaid rpm adjusting means.

The advantages offered by the transport system of the invention reside in particular in the fact that the tension of the magnetic tape is influenced by electrical means in a very simple manner while retaining a double capstan drive, and in that the synchronization of the capstans is stabilized by electrical means. Thereby, the stability of the tape run and the contact between the tape and the recording and reproducing head are improved, while at the same time extremely short switching times are achieved for the starting and stopping of the tape run and for the reversal of the direction of tape run. Thereby, both of these operations can be effected solely by a corresponding control of the motors. Power magnets conventionally used with the pressure rollers are thus rendered superfluous.

The invention will be better understood, and further objects and advantages will become apparent from the ensuing detailed specification of preferred but merely exemplary embodiments taken in conjunction with the drawings.

BRIEF DESCRIPTION OF THE DRAWINGS

FIG. 1 illustrates schematically a preferred embodiment of the transport system according to the invention; and FIG. 2 shows a modification of switch means in the embodiment of FIG. 1.

DETAILED DESCRIPTION OF THE EMBODIMENT

Referring in particular to FIG. 1, a magnetic tape 1 is driven by means of capstans 2 and 3 with the aid of pressure rollers 4 and 5 in the direction of arrow 6 past magnetic head means 7. In the switch position shown in FIG. 1, the drive motor 8, associated with capstan 3, is supplied with the operating voltage via a lead 19 and therefore drives magnetic tape 1 at a determined speed.

Simultaneously, the rotor of motor 9 and capstan 2 associated therewith are driven by a driving disc 12 which is in turn driven by a transmission belt 10, which is preferably a flat belt of small thickness so as to attain satisfactory constant-speed values, from the motor 8 via its driving disc 11. The voltage which is thereby induced in the rotor of motor 9 is proportional to the rpm of motor 8 associated with capstan 3, and this voltage is therefore an indicating value for the speed of the magnetic tape 1. It is of special advantage that in this case, the operating voltage is not applied to motor 9, so that its tachometer voltage is substantially free from erroneous information. The tachometer voltage of motor 9 (actual value) is applied via a direction reversing switch 13 to the variable ohmic resistance 14. By means of this resistance 14, motor 9 can be electrically braked in a simple and, when required, easily adjustable manner. Thereby the extension of the length of belt 10 and at the same time the tensioning of magnetic tape 1 are increased. Simultaneously, the tachometer voltage of motor 9 is also applied to the inverting input line 15 of the rpm adjusting unit 16. A reference voltage (assigned value) is applied to the non-inverting input line 17 of the rpm adjusting unit 16; this reference voltage can be selected by means of the tape speed selector 18 in accordance with a desired tape speed and is compared with the tachometer voltage by means of differential input means of the rpm adjusting unit 16. Thereby, the operating voltage of line 19 is adjusted in a simple manner so as to ensure a constant rpm of motor 8, and thereby a constant speed of magnetic tape 1. When reversing the direction of tape run, the operative functions of the two motors 8 and 9 described herein before are interchanged by switching the tape run reversing switch 13 to the positions shown in FIG. 2. It can be advantageous to eliminate excessive tolerances of motors 8 and/or 9, which could undesirably affect the speed or the tension of tape 1, by using a switch circuit as shown in FIG. 2. In order to achieve a rapid stopping of the tape, the stop switch 19' is actuated and thereby short circuits the rotor windings of motors 8 and 9, and thus shortens the stopping time.

In the part of the circuit shown in FIG. 2, the resistors 14a and 14b are fixed, while the resistors 14c and 14d are adjustable.

By adjusting the resistors 14c and 14d, which determine the operational voltage and braking effect of motor 9, to be closer to the ohmic resistances of resistors 14a and 14b, which determine the operational voltage and braking effect of motor 8, the tolerance between motors 8 and 9 is reduced.

In FIG. 1, three magnetic heads 7 are shown of which the middle one is a recording and reproducing head while the two other heads are well-known to be erasing heads. However, it is also possible to employ only a single magnetic head or two magnetic heads 7.

A regulating circuit suitable to be used as adjusting unit 16 has, for instance, been described in FIG. 5 of an instruction pamphlet of Texas Instruments, European Applications Lab, Freising, Germany, which pamphlet was issued on March 25, 1970, under the title of "T I - Plastic Power Transistoren in NF-Verstaerkern mit symmetrischer Betriebsspannung". In order to insert this circuit, line 15 in the figure of the accompanying drawing must be connected directly to a transistor T2, and the line 17 of the accompanying drawing must be connected directly to the transistor T1, in the circuit shown in FIG. 5 of the above-mentioned pamphlet, while line 19 leading from the output post of adjusting unit 16 to the motors (8 in FIG. 1 in accordance with the position of switches 13 and 19') replaces the output line leading to the loud speaker in FIG. 5 of the pamphlet. Capacitors C1 and C6 which are shown in FIG. 5 of the pamphlet must be omitted in the adjusting unit shown in the figure of the accompanying drawing.

I claim:

1. In a tape transport system for use in a magnetic tape recorder and reproducer set wherein a magnetic tape is simultaneously driven by means of two capstans, the improvement comprising two motors, one of which is associated with one of said capstans, and the other with the other capstan, driving discs connected to said motors, transmission belt means connecting the driving discs of the two motors, means for operating the motor downstream relative to the moving magnetic tape as the driving motor for said tape, electrical circuit means associatable with said upstream motor for adapting the latter as a tachometer-generator, and means for controlling the rpm of said downstream motor by applying thereto signals emitted by said tachometer-generator.

2. The improved tape transport system as described in claim 1, further comprising electrical braking means for braking the motor upstream relative to the other motor seen in the direction of the moving tape.

3. The improved tape transport system as described in claim 2, wherein said electrical braking means comprise an adjustable load resistor.

4. The improved tape transport system as described in claim 2, further comprising a transistor circuit comprising differentially put means and being adapted for serving as rpm adjusting unit for the control of said motors, said transistor circuit having inverting input means and non-inverting input means, means for applying a tachometer voltage from said tachometer-generator to said inverting input means, and means for applying a reference voltage, corresponding to a desired tape speed, to said non-inverting input means.

5. The improved tape transport system as described in claim 1, wherein said motors are commutator motors comprising iron-free rotors.

6. The improved tape transport system as described in claim 1, wherein said capstans serve as spindles for said two motors.

7. The improved tape transport system as described in claim 1, further comprising pressure rollers urging said magnetic tape against said capstans, means for reversing the direction of run of said tape, and means for maintaining the pressure of said pressure rollers on said tape during reversal of the direction of tape run by said reversal means.

8. The improved tape transport system as described in claim 7, further comprising current supply means and means for interrupting the supply of electrical current to said driving downstream motor, and means for maintaining the pressure of said pressure rollers on said tape during stopping and starting of said driving motor, whereby rapid starting and stopping of the magnetic tape is ensured.

9. The improved tape transport system as described in claim 8, further comprising current supply means, means for interrupting the supply of electric current to the driving downstream motor and means for shortcircuiting the windings of the rotors of said motors concurrently with interruption of current supply to said driving motor.

10. The improved tape transport system as described in claim 1, further comprising adjustable resistor means adapted for eliminating excessive tolerances in the operation of said motors which may undesirably influence the tape speed or the tensioning of the tape or both.

* * * * *